(12) United States Patent
Ohtoshi et al.

(10) Patent No.: US 9,024,989 B2
(45) Date of Patent: May 5, 2015

(54) REGISTRATION ADJUSTMENT METHOD FOR IMAGE FORMING APPARATUS AND IMAGE FORMING APPARATUS

(75) Inventors: Takenori Ohtoshi, Osaka (JP); Norio Tomita, Osaka (JP); Kiyoshi Sasoh, Osaka (JP); Yuji Kumagai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 381 days.

(21) Appl. No.: 13/540,889

(22) Filed: Jul. 3, 2012

(65) Prior Publication Data

US 2013/0016169 A1    Jan. 17, 2013

(30) Foreign Application Priority Data

Jul. 12, 2011 (JP) ................................. 2011-154129

(51) Int. Cl.
| | |
|---|---|
| *B41J 2/47* | (2006.01) |
| *B41J 2/525* | (2006.01) |
| *G03G 21/20* | (2006.01) |
| *G03G 15/04* | (2006.01) |
| *H04N 1/00* | (2006.01) |
| *H04N 1/113* | (2006.01) |
| *H04N 1/23* | (2006.01) |
| *H04N 1/50* | (2006.01) |

(52) U.S. Cl.
CPC *B41J 2/525* (2013.01); *B41J 2/473* (2013.01); *G03G 21/20* (2013.01); *G03G 15/04045* (2013.01); *H04N 1/00015* (2013.01); *H04N 1/00023* (2013.01); *H04N 1/00031* (2013.01); *H04N 1/00045* (2013.01); *H04N 1/00055* (2013.01); *H04N 1/00063* (2013.01); *H04N 1/00068* (2013.01); *H04N 1/00087* (2013.01); *H04N 1/0009* (2013.01); *H04N 1/1135* (2013.01); *H04N 1/2346* (2013.01); *G03G 2215/0158* (2013.01); *H04N 2201/0471* (2013.01); *H04N 2201/04722* (2013.01); *H04N 2201/04729* (2013.01); *H04N 2201/04732* (2013.01); *H04N 2201/0094* (2013.01); *H04N 1/506* (2013.01)

(58) Field of Classification Search
CPC .................................. B41J 2/473; B41J 2/525
USPC .................................................. 347/116, 133
See application file for complete search history.

(56) References Cited

U.S. PATENT DOCUMENTS 5,828,925 A * 10/1998 Yoshizawa ...................... 399/39

FOREIGN PATENT DOCUMENTS

| JP | 2003-337456 | 11/2003 |
|---|---|---|
| JP | 2004-101889 | 4/2004 |

(Continued)

*Primary Examiner* — Justin Seo
*Assistant Examiner* — Kendrick Liu
(74) *Attorney, Agent, or Firm* — Renner, Otto, Boisselle & Sklar, LLP

(57) ABSTRACT

In a registration step, the temperature near a polygon mirror (83) is detected by a first temperature sensor (85), and the internal ambient temperature of an image forming apparatus (1) is detected by a second temperature sensor (86). Also, a registration adjustment value of each color is determined and stored in a memory (75). In a printing step, the registration adjustment value (A) of each color determined in the registration step is corrected based on a change in the temperature near the polygon mirror (83) and a change in the internal ambient temperature of the image forming apparatus (1). Furthermore, the write timing of an electrostatic latent image onto each photosensitive drum (13) by an optical scanning device (11) is controlled. Then, the position of the electrostatic latent image on each photosensitive drum (13) is shifted by an amount corresponding to the corrected registration adjustment value.

4 Claims, 8 Drawing Sheets

(56) References Cited

FOREIGN PATENT DOCUMENTS

| JP | 2005-156992 | 6/2005 |
| JP | 2006-251226 | 9/2006 |
| JP | 2007-086439 | 4/2007 |
| JP | 2009-063650 | 3/2009 |
| JP | 2010-102122 | 5/2010 |
| JP | 2010-151989 | 7/2010 |

* cited by examiner

REGISTRATION ADJUSTMENT METHOD FOR IMAGE FORMING APPARATUS AND IMAGE FORMING APPARATUS

CROSS-REFERENCE TO RELATED APPLICATION

This application claims priority under 35 U.S.C. §119(a) on Patent Application No. 2011-154129 filed in Japan on Jul. 12, 2011, the entire contents of which are herein incorporated by reference.

BACKGROUND OF THE INVENTION

1. Field of the Invention

The present invention relates to image forming apparatuses such as electrophotographic printers, copy machines and facsimile machines, and more particularly to a registration adjustment method for an image forming apparatus that forms and prints color images and such an image forming apparatus.

2. Description of the Related Art

With a conventional image forming apparatus, latent images are written onto a plurality of respective image carriers (photosensitive drums) with laser light from an optical scanning device (LSU). The latent image on each image carrier is developed with toner of the corresponding color so as to form a visible image of the color on the image carrier. The visible images of respective colors are transferred, one above the other, from the image carriers to an intermediate transfer member (intermediate transfer belt), so as to form a color visible image on the intermediate transfer member. Also, the color visible image is transferred from the intermediate transfer member onto recording paper. With such a conventional configuration, there are cases where color drift occurs in which visible images of respective colors are displaced with each other when transferred from the image carriers to the intermediate transfer member, resulting in degradation of the quality of the color image. To address this, displacement of a visible image of each color is corrected by measuring the amount of displacement (in other words, registration adjustment value) of the color visible image on the intermediate transfer member, and controlling the write timing of a latent image onto the corresponding one of the image carriers, thereby shifting the position of the latent image on the image carrier by an amount corresponding to the registration adjustment value.

However, due to change in the temperature (ambient temperature or internal temperature) of the optical scanning device (LSU), the position of the latent image on each image carrier varies, and the amount of displacement of the visible image of each color on the intermediate transfer member varies. Accordingly, displacement of the visible image of each color cannot be accurately corrected by keeping the registration adjustment value fixed.

In view of this, for example, JP 2007-86439A (Patent Document 1) discloses an image forming apparatus in which a temperature sensor is provided near the optical scanning device (LSU), the registration adjustment value is corrected according to the change of the ambient temperature detected by the temperature sensor, whereby displacement of the visible image of each color is corrected more accurately.

Also, JP 2009-63650A (Patent Document 2) discloses an image forming apparatus in which a first temperature sensor for detecting the temperature between a paper discharge tray and a first scanner and a second temperature sensor for detecting the temperature between the first scanner and a second scanner are provided, and color drift correction is performed by adjusting the lasing position based on the temperatures detected by the first and second temperature sensors.

Furthermore, JP 2004-101889A (Patent Document 3) discloses an image forming apparatus in which an imaging means, an endless belt, a first temperature sensor for detecting the temperature near a transfer means or the like, and a second temperature sensor for detecting the internal temperature of the image forming apparatus are provided, and color drift correction is performed by determining the operation timing of a color drift correction means based on the temperatures detected by the first and second temperature sensors.

The main cause of color drift is considered to result from the optical scanning device (LSU), in which when there is a change in the internal temperature of the LSU, the orientation of each mirror provided in the LSU changes.

Accordingly, it is considered reasonable to correct color drift by using a method in which the internal temperature of the LSU is detected, and the registration adjustment value is corrected according to the change of the internal temperature. Also, inside the LSU, because a driving motor for a polygon mirror generates the largest amount of heat, detecting the temperature near the polygon mirror is considered essential.

However, Patent Document 1 detects the temperature near the LSU, rather than the internal temperature of the LSU. Also, Patent Documents 2 and 3 detect temperature at a plurality of locations, but they detect the ambient temperature outside the LSU, rather than the internal temperature of the LSU. Since the change of the internal temperature of the LSU, which is the main cause of color drift, is not referred to, it is difficult to improve the accuracy of color drift correction.

The experiments performed by the inventors of the present application have revealed that merely correcting the registration adjustment value according to the temperature change near the polygon mirror does not result in accurate correction of displacement of the visible image of each color, and there is a possibility that displacement of the visible image of each color might become larger.

For example, when the internal ambient temperature of the image forming apparatus changes from low to high immediately after activation of the image forming apparatus, or when the image forming apparatus has transitioned from continuous printing state (full-capacity operation state) to intermittent printing state, and the internal ambient temperature of the image forming apparatus changes from high to low, the ambient temperature starts to change much later than the temperature change near the polygon mirror, so the registration adjustment value cannot be accurately corrected only by correcting the registration adjustment value according to the temperature change near the polygon mirror until the ambient temperature starts to change, and registration obtained as a result of correction degraded than before correction.

Accordingly, when the LSU is the main cause of color drift, it is essential to correct the registration adjustment value according to the temperature change near the polygon mirror, and at the same time, in order to improve the accuracy of color drift correction, it is also necessary to give consideration to the internal ambient temperature of the image forming apparatus.

SUMMARY OF THE INVENTION

The present invention has been made in view of the problems encountered with the conventional techniques, and it is an object of the present invention to provide a registration adjustment method for an image forming apparatus that is capable of performing color drift correction with high accuracy by correcting the registration adjustment value by referring to not only the temperature near the polygon mirror of the LSU but also to the internal ambient temperature of the image forming apparatus, and such an image forming apparatus.

In order to solve the problems described above, the present invention is premised on an image forming apparatus including an imaging process unit that forms a color visible image by writing a latent image on each of a plurality of image carriers with laser light from an optical scanning device, developing the latent images on the image carriers to form visible images of respective colors on the image carriers, and superimposing and transferring the visible images of respective colors on the image carriers onto a recording medium and a registration correction unit that detects displacement of test patterns of each color in the color visible image as a registration adjustment value and corrects positions of the superimposed and transferred visible images of respective colors based on the registration adjustment values. A registration adjustment method for such an image forming apparatus is configured to include a temperature detecting step of detecting a temperature near a polygon mirror that reflects and scans the laser light in the optical scanning device by using a first temperature detecting unit and detecting a temperature at a location that is farther away from the polygon mirror than the first temperature detecting unit is by using a second temperature detecting unit; and a registration correction operation step of correcting the registration adjustment values based on a change in the temperature detected by the first temperature detecting unit and a change in the temperature detected by the second temperature detecting unit.

According to the registration adjustment method for an image forming apparatus of the present invention, not only the temperature change near the polygon mirror of the optical scanning device but also the temperature change in a location that is away from the polygon mirror is determined, and the registration adjustment value can be corrected based on the temperature changes. The temperature at the location that is away from the polygon mirror is closer to the internal ambient temperature of the image forming apparatus than the temperature near the polygon mirror is. Accordingly, it can be said that the registration adjustment value is corrected by referring not only to the temperature change near the polygon mirror of the optical scanning device, but also to the change of the internal ambient temperature of the image forming apparatus, so color drift can be corrected more accurately.

The imaging process unit carries out an imaging process in which a latent image is written onto each image carrier (photosensitive drum) by using laser light from the optical scanning device (hereinafter referred to as LSU), the latent image on the image carrier is developed, its visible image is transferred from the image carrier to the intermediate transfer member (intermediate transfer belt) and the visible image is transferred from the intermediate transfer member to recording paper. The imaging process unit does not include a configuration for supplying recording paper or fixing the visible image on recording paper.

It is preferable that, in the registration correction operation step of the registration adjustment method for an image forming apparatus of the present invention, a first registration intermediate adjustment value that varies according to the change in the temperature detected by the first temperature detecting unit is determined, a first correction amount that varies according to the change in the temperature detected by the first temperature detecting unit is determined, a second correction amount that varies according to the change in the temperature detected by the second temperature detecting unit is determined, and a sum of the first correction amount and the second correction amount is determined as the registration adjustment value.

An image forming apparatus of the present invention includes an imaging process unit that forms a color visible image by writing a latent image on each of a plurality of image carriers with laser light from an optical scanning device, developing the latent images on the image carriers to form visible images of respective colors on the image carriers, and superimposing and transferring the visible images of respective colors on the image carriers onto a recording medium and a registration correction unit that detects displacement of test patterns of each color in the color visible image as a registration adjustment value and corrects positions of the superimposed and transferred visible images of respective colors based on the registration adjustment values. The image forming apparatus of the present invention further includes a first temperature detecting unit that detects a temperature near a polygon mirror that reflects and scans the laser light in the optical scanning device, a second temperature detecting unit that detects a temperature at a location that is inside the optical scanning device and farther away from the polygon mirror than the first temperature detecting unit is and a registration correction operation unit that corrects the registration adjustment values based on a change in the temperature detected by the first temperature detecting unit and a change in the temperature detected by the second temperature detecting unit.

With the image forming apparatus of the present invention as described above, not only the temperature change near the polygon mirror of the optical scanning device but also the temperature change in a location that is inside the optical scanning device and is away from the polygon mirror is determined, and the registration adjustment value can be corrected based on the temperature changes. The temperature in the location that is inside the optical scanning device and is away from the polygon mirror varies by being more significantly affected by the internal ambient temperature of the image forming apparatus than by the temperature near the polygon mirror. Accordingly, it can be said that the registration adjustment value is corrected by referring not only to the temperature change near the polygon mirror of the optical scanning device, but also to change of the internal ambient temperature of the image forming apparatus, so color drift can be corrected more accurately.

Also, the image forming apparatus of the present invention may be configured to include a first temperature detecting unit that detects a temperature near a polygon mirror that reflects and scans the laser light in the optical scanning device; a second temperature detecting unit that detects an internal ambient temperature of the image forming apparatus outside the optical scanning device; and a registration correction operation unit that corrects the registration adjustment values based on a change in the temperature detected by the first temperature detecting unit and a change in the temperature detected by the second temperature detecting unit.

With the image forming apparatus of the present invention as described above, not only the temperature change near the polygon mirror of the optical scanning device is determined, but also the change of the internal ambient temperature of the image forming apparatus is determined outside the optical scanning device, and the registration adjustment value can be corrected based on the temperature changes. Accordingly, it can be said that the registration adjustment value is corrected by referring not only to the temperature change near the polygon mirror of the optical scanning device, but also to the change of the internal ambient temperature of the image forming apparatus, so color drift can be corrected more accurately.

Also, in the image forming apparatus, it is preferable that the registration correction operation unit determines a first registration intermediate adjustment value that varies according to the change in the temperature detected by the first temperature detecting unit, determines a first correction amount that varies according to the change in the temperature detected by the first temperature detecting unit, determines a second correction amount that varies according to the change in the temperature detected by the second temperature detecting unit, and determines a sum of the first correction amount and the second correction amount as the registration adjustment value.

DETAILED DESCRIPTION OF THE INVENTION

Figure 1:
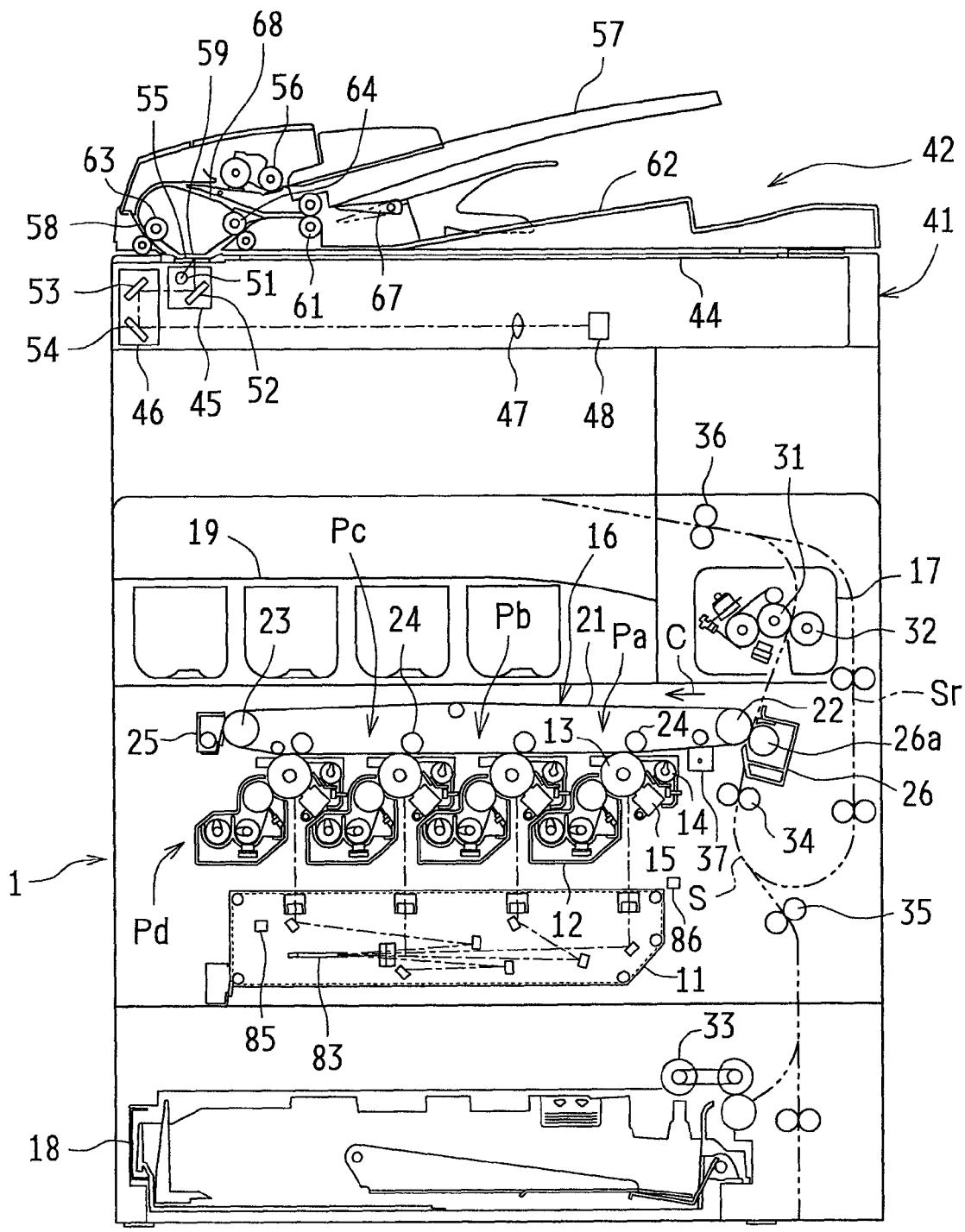
FIG. 1 is a cross-sectional view showing an embodiment of an image forming apparatus of the present invention.

An image forming apparatus 1 shown in FIG. 1 is a so-called multifunction peripheral with a scanner function, a copy function, a printer function, a facsimile function, and so on. The image forming apparatus 1 is configured to transmit an image of an original read by an image reading device 41 to the outside (corresponding to the scanner function) and record/form the read original image or an image received from the outside on recording paper in color or monochrome (corresponding to the copy function, the printer function and the facsimile function).

In order to print images on recording paper, the image forming apparatus 1 includes an optical scanning device 11, developing devices 12, photosensitive drums 13, drum cleaning devices 14, chargers 15, an intermediate transfer belt device 16, a fixing device 17, a paper conveyance path S, a paper cassette 18, a paper discharge tray 19, and the like.

The image forming apparatus 1 handles image data corresponding to color images using colors of black (K), cyan (C), magenta (M) and yellow (Y) and image data corresponding to monochrome images using a single color (for example, black). In order to form four types of toner images corresponding to the colors of black, cyan, magenta and yellow, there are provided four developing devices 12, four photosensitive drums 13, four drum cleaning devices 14 and four chargers 15 so as to correspond to the respective colors, forming four image forming stations Pa, Pb, Pc and Pd.

Each photosensitive drum 13 includes a photosensitive layer on the surface thereof. Each charger 15 is a charging means for uniformly charging the surface of the corresponding one of the photosensitive drums 13 to a predetermined potential. The charger 15 may be a contact type roller or brush charger, or a charging type charger.

The optical scanning device 11 is a laser scanning unit (LSU) including laser diodes, a polygon mirror and reflective mirrors. The optical scanning device 11 scans the surface of each photosensitive drum with laser light by emitting laser light from the corresponding one of the laser diodes to the polygon mirror so as to reflect the laser light at the polygon mirror that is rotatably driven, thereby deflect the laser light in the main scanning direction and cause the laser light to reflect at the corresponding one of the reflective mirrors and be incident on the photosensitive drum surface. There are provided laser diodes corresponding to black, cyan, magenta and yellow so that the laser light from each laser diode is modulated according to the image data, the surface of the corresponding one of the photosensitive drums 13 is scanned with the laser light, and an electrostatic latent image is formed on the surface of the photosensitive drum 13.

Each developing device 12 develops the electrostatic latent image formed on the surface of the corresponding one of the photosensitive drums 13 with color toner thereof and forms a toner image (visible image) on the surface of the photosensitive drum 13. Each drum cleaning device 14 removes and collects residual toner on the surface of the corresponding one of the photosensitive drums 13 after the image has been developed and transferred.

The intermediate transfer belt device 16 is disposed above the photosensitive drums 13 and includes an intermediate transfer belt 21, an intermediate transfer belt driving roller 22, an idler roller 23, four intermediate transfer rollers 24 and a belt cleaning device 25.

The intermediate transfer belt 21 is made of a film formed into an endless belt. The intermediate transfer belt 21 is supported by and wound around the intermediate transfer belt driving roller 22, the idler roller 23, the intermediate transfer rollers 24 and the like, so as to cause the intermediate transfer belt 21 to rotatably move in the direction indicated by the arrow C.

Each intermediate transfer roller 24 is supported so as to be capable of rotation near the intermediate transfer belt 21, and is pressed by the corresponding one of the photosensitive drums 13 via the intermediate transfer belt 21. The toner image on the surface of each photosensitive drum 13 is sequentially superimposed and transferred onto the intermediate transfer belt 21, whereby a color image (color visible image) composed of the superimposed toner images of respective colors is formed on the intermediate transfer belt 21. Transfer of the toner image from each photosensitive drum 13 to the intermediate transfer belt 21 is carried out by the corresponding one of the intermediate transfer rollers 24 that are in press contact with the back face of the intermediate transfer belt 21.

Each intermediate transfer roller 24 is a roller that includes a metal (for example, stainless steel) shaft as a base, with its surface covered by a conductive elastic material (for example EPDM, foamed urethane or the like). A high-voltage transfer bias (a high voltage having a polarity (+) opposite to the charging polarity (−) of toner) is applied to each intermediate transfer roller 24 in order to transfer the toner image, and high voltage is uniformly applied to recording paper by the conductive elastic material.

The color image formed on the intermediate transfer belt 21 is conveyed together with the intermediate transfer belt 21 and transferred onto recording paper in a nip region between the intermediate transfer belt 21 and a secondary transfer roller 26a of a secondary transfer device 26.

A voltage (a high voltage having a polarity (+) opposite to the charging polarity (−) of toner) for transferring the toner images of respective colors on the intermediate transfer belt 21 onto the recording paper is applied to the secondary transfer roller 26a of the secondary transfer device 26.

There are cases where the toner images on the intermediate transfer belt 21 are not completely transferred onto the recording paper by the secondary transfer device 26, and toner remains on the surface of the intermediate transfer belt 21. The residual toner is likely to generate toner of mixed colors in the next step. Accordingly, the belt cleaning device 25 removes and collects the residual toner on the surface of the intermediate transfer belt 21.

The belt cleaning device 25 is provided with, for example as a cleaning member, a cleaning blade that is in contact with the surface of the intermediate transfer belt 21 and removes residual toner. The intermediate transfer belt 21 is supported, at a position where the cleaning blade is in contact, by the idler roller 23 from the back face.

The color image is transferred onto recording paper in the nip region between the intermediate transfer belt 21 and the secondary transfer roller 26a of the secondary transfer device 26. After that, the recording paper is conveyed to the fixing device 17. The fixing device 17 includes a heating roller 31, a pressure roller 32 and the like, and conveys the recording paper while sandwiching the recording paper between the heating roller 31 and the pressure roller 32.

The heating roller 31 is controlled so as to have a predetermined fixing temperature, and thermally compresses the recording paper together with the pressure roller 32, so as to fuse, mix and press contacts the color image (toner images of respective colors) that has been transferred onto the recording paper and thermally fix the image onto the recording paper.

In a lower portion of the image forming apparatus 1, the paper cassette 18 for supplying recording paper is provided. The image forming apparatus 1 is provided with the paper conveyance path S for transporting the recording paper supplied from the paper cassette 18 to the paper discharge tray 19 via the secondary transfer device 26 and the fixing device 17.

A paper pickup roller 33 is provided at an end portion of the paper cassette 18. The paper pickup roller 33 picks up, one by one, sheets of recording paper from the paper cassette 18 and conveys the recording paper to the paper conveyance path S.

Paper registration rollers 34, the fixing device 17, conveyance rollers 35, and paper discharge rollers 36 and the like are disposed along the paper conveyance path S. The conveyance rollers 35 are composed of small rollers for facilitating and assisting conveyance of recording paper, and a plurality of sets thereof are provided.

The paper registration rollers 34 align the leading edge of recording paper by temporarily stopping the conveyed recording paper. The paper registration rollers 34 convey the recording paper at the right timing along with the rotation of the photosensitive drums 13 and the intermediate transfer belt 21 such that the color image on the intermediate transfer belt 21 is transferred onto the recording paper at the nip region between the intermediate transfer belt 21 and the secondary transfer roller 26a of the secondary transfer device 26.

After the color image has been fixed onto the recording paper by the fixing device 17, the recording paper passes through the fixing device 17 and thereafter is discharged face-down onto the paper discharge tray 19 by the paper discharge rollers 36.

In the case where printing is performed on the back face of the recording paper in addition to the front face of the recording paper, the paper discharge rollers 36 are stopped and rotated in the reverse direction while the recording paper is conveyed by the paper discharge rollers 36. Then, the recording paper is passed through a reverse path Sr so as to turn over the recording paper and then guided to the paper registration rollers 34. In the same manner as the front face of the recording paper, the image is recorded and fixed on the back face of the recording paper, and the recording paper is then discharged to the paper discharge tray 19.

Next, an image reading device 41 and an original conveyance device 42 mounted in an upper portion of the main body of the image forming apparatus 1 will be described.

The original conveyance device 42 is configured so as to be capable of being opened and closed by the backmost side thereof being pivotally supported by the backmost side of the image reading device 41 with a hinge (not shown) and by the front portion of the original conveyance device 42 being moved up and down. When the original conveyance device 42 is lifted, an original can be placed on a platen glass plate 44 of the image reading device 41.

The image reading device 41 includes the platen glass plate 44, a first scanning unit 45, a second scanning unit 46, an imaging lens 47, a CCD (Charge Coupled Device) 48 and the like.

The first scanning unit 45 includes a light source 51 and a first reflective mirror 52. The first scanning unit 45, while moving by a distance corresponding to the size of the original in the sub-scanning direction at a constant speed V, exposes the original on the platen glass plate 44 with light using the light source 51, so as to cause the reflected light to reflect at the first reflective mirror 52 and guide the light to the second scanning unit 46. The image on the surface of the original is thereby scanned in the sub-scanning direction.

The second scanning unit 46 includes second and third reflective mirrors 53 and 54. The second scanning unit 46 reflects the reflected light from the original at the second and third reflective mirrors 53 and 54 and guides the light to the imaging lens 47 while moving at a speed V/2 to follow the first scanning unit 45. The imaging lens 47 collects the reflected light from the original into a CCD 48 and forms the image on the surface of the original on the CCD 48. The CCD 48 repeatedly scans the original image in the main scanning direction, and outputs a single main scan line worth of analog image signal for each scan.

The image reading device 41 is capable of reading, not only an image on a stationary original, but also an image on the surface of an original conveyed by the original conveyance device 42. In this case, the first scanning unit 45 is moved below an original reading glass plate 55 so as to position the second scanning unit 46 according to the position of the first scanning unit 45, and in this state, the original conveyance device 42 starts conveying the original.

The original conveyance device 42 picks up the original by rotating a pickup roller 56 while pressing the pickup roller 56 against the original on an original tray 57, and conveys the original via an original conveyance path 58. The original is passed through between the original reading glass plate 55 and a reading guide plate 59, and then conveyed from a paper discharge roller 61 to a paper discharge tray 62. In the original conveyance device 42, a registration roller 63 for aligning the leading edge of the original and conveying the original, and a conveyance roller 64 for conveying the original are disposed along the original conveyance path 58.

While the original is conveyed as described above, the surface of the original is illuminated by the light source 51 of the first scanning unit 45 via the original reading glass plate 55, reflected light from the surface of the original is guided to the imaging lens 47 by respective reflective mirrors of first and second scanning units 45 and 46, and the reflected light from the surface of the original is collected into the CCD 48 by the imaging lens 47 so as to form the image on the surface of the original on the CCD 48, whereby the image of the surface of the original is read.

In the case of reading the back face of the original, as indicated by a dotted line, an intermediate tray 67 is rotated about its axis, and the original is discharged from the paper discharge roller 61 to the paper discharge tray 62. During conveyance of the original, the paper discharge roller 61 is stopped so that the original is received on the intermediate tray 67. The paper discharge roller 61 is rotated in the reverse direction so as to guide the original to the registration roller 63 via a reverse conveyance path 68 and turn over the original. In the same manner as in the case of the image on the front face of the original, the image on the back face of the original is read, the intermediate tray 67 is moved back to the original position indicated by a solid line, and the original is discharged from the paper discharge roller 61 to the paper discharge tray 62.

The image of the original read by the CCD 48 is output from the CCD 48 in the form of an analog image signal, and the analog image signal is A/D converted to a digital image signal (image data). The image data is subjected to various types of image processing and then transmitted to and received by the LSU 11 of the image forming apparatus 1, where the image is recorded on recording paper, and the recording paper is output as a copy of the original.

Meanwhile, toner images of respective colors are formed on the photosensitive drums 13 of the image forming stations Pa, Pb, Pc and Pd, and the toner images of respective colors on the photosensitive drums 13 are sequentially superimposed and transferred onto the intermediate transfer belt 21. Accordingly, there are cases where the toner images of respective colors are transferred to displaced positions on the intermediate transfer belt 21, causing color drift and degrading the quality of the color image.

To address this, a registration step is carried out at the time of activation of the image forming apparatus 1, so as to measure and determine the amount of displacement (registration adjustment values) of the toner image of each color on the intermediate transfer belt 21. In a color image printing step, the write timing of an electrostatic latent image onto each photosensitive drum 13 by the LSU 11 is controlled, and the position of the electrostatic latent image on each photosensitive drum 13 is shifted by an amount corresponding to the registration adjustment value so as to correct the displacement of the toner image of each color on the intermediate transfer belt 21. This suppresses color drift of the color image transferred onto the recording paper.

When there is a change in the internal temperature of the optical scanning device (hereinafter referred to as LSU) 11, the orientation of each mirror provided in the LSU 11 changes, causing color drift. In particular, a driving motor for the polygon mirror generates the largest amount of heat, so the color drift tends to vary in proportion to the temperature change near the polygon mirror. For this reason, it is most preferable to correct the registration adjustment value according to the temperature change near the polygon mirror.

Also, as described above, in order to improve the accuracy of color drift correction, it is also necessary to give consideration to the internal ambient temperature of the image forming apparatus 1.

Accordingly, in the present embodiment, the temperature change near the polygon mirror of the LSU 11 is detected, and also change in the internal ambient temperature of the image forming apparatus 1 is detected outside the LSU 11. The registration adjustment value is corrected based on the temperature changes, and thereby the displacement of the toner images of respective colors is accurately corrected.

Next is an overall description of correction for the registration adjustment value based on the temperature change near the polygon mirror and the change in the internal ambient temperature of the image forming apparatus 1.

Figure 2:
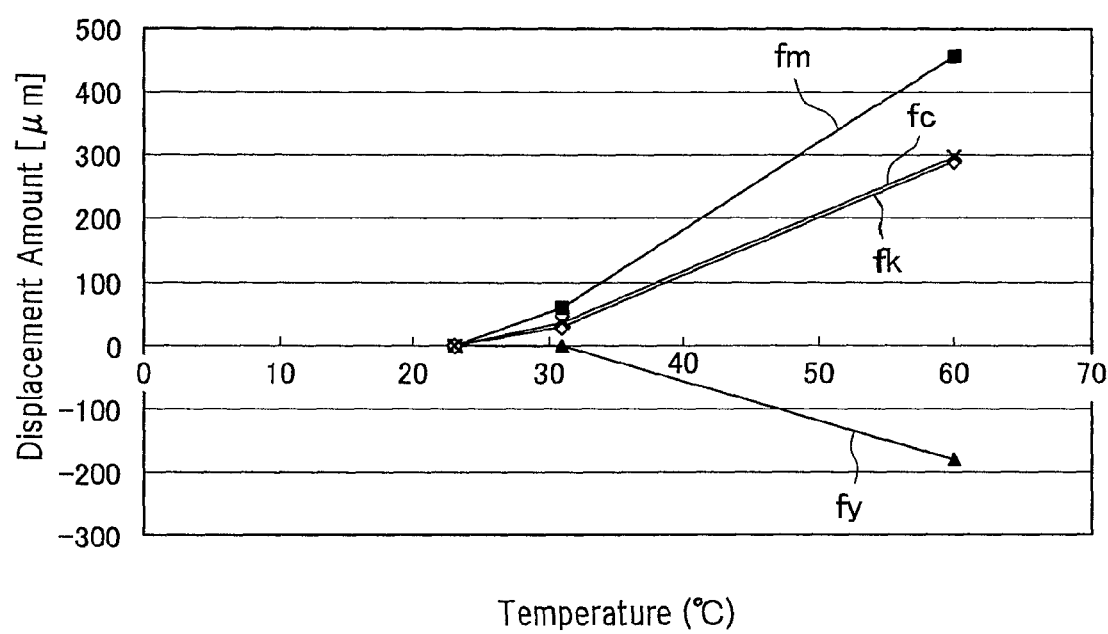
FIG. 2 is a graph showing displacement amount characteristics of toner images on an intermediate transfer belt versus change in the temperature near a polygon mirror in an LSU of the image forming apparatus shown in FIG. 1.

FIG. 2 shows characteristics obtained by repeatedly measuring the amount of displacement of the toner images on the intermediate transfer belt 21 while the temperature near the polygon mirror rises from the point in time when the LSU 11 is activated. The influence of the change in the external temperature of the LSU 11 (the internal ambient temperature of the image forming apparatus 1) was reduced by keeping the external temperature of the LSU 11 substantially constant.

In the graph of FIG. 2, characteristics fk indicate the amount of displacement of the black toner image, characteristics fc indicate the amount of displacement of the cyan toner image, characteristics fm indicate the amount of displacement of the magenta toner image, and characteristics fy indicate the amount of displacement of the yellow toner image. As can be seen from the graph of FIG. 2, in all of the characteristics fk, fc, fm and fy, the amount of displacement is directly or inversely proportional to the temperature change near the polygon mirror.

In the case where the amount of correction for the registration adjustment value is determined based on such displacement amount characteristics of the toner images that are proportional to the temperature change near the polygon mirror, the following equation (1) is used:

$$B=h(k1a-k1b) \qquad (1),$$

where B is the amount of correction for the registration adjustment value (first correction amount), h is a positive or negative coefficient, $k1a$ is the temperature near the polygon mirror during the registration step at the time of activation of the image forming apparatus 1, and $k1b$ is the temperature near the polygon mirror during the printing step by the image forming apparatus 1.

However, even when the temperature near the polygon mirror is measured at the time of activation of the image forming apparatus 1, the registration step is carried out, and for each color, the amount of displacement (registration adjustment value) of the toner image on the intermediate transfer belt 21 is measured and determined, after which in the color image printing step, the temperature near the polygon mirror is measured, and for each color, the registration adjustment value is corrected using the first correction amount B obtained with the above equation (1), the write timing of an electrostatic latent image onto each photosensitive drum 13 by the LSU 11 is controlled, and the position of the electrostatic latent image on the photosensitive drum 13 is shifted by an amount corresponding to the corrected registration adjustment value, the displacement of the toner images of respective colors on the intermediate transfer belt 21 cannot be accurately corrected.

Figure 3A:
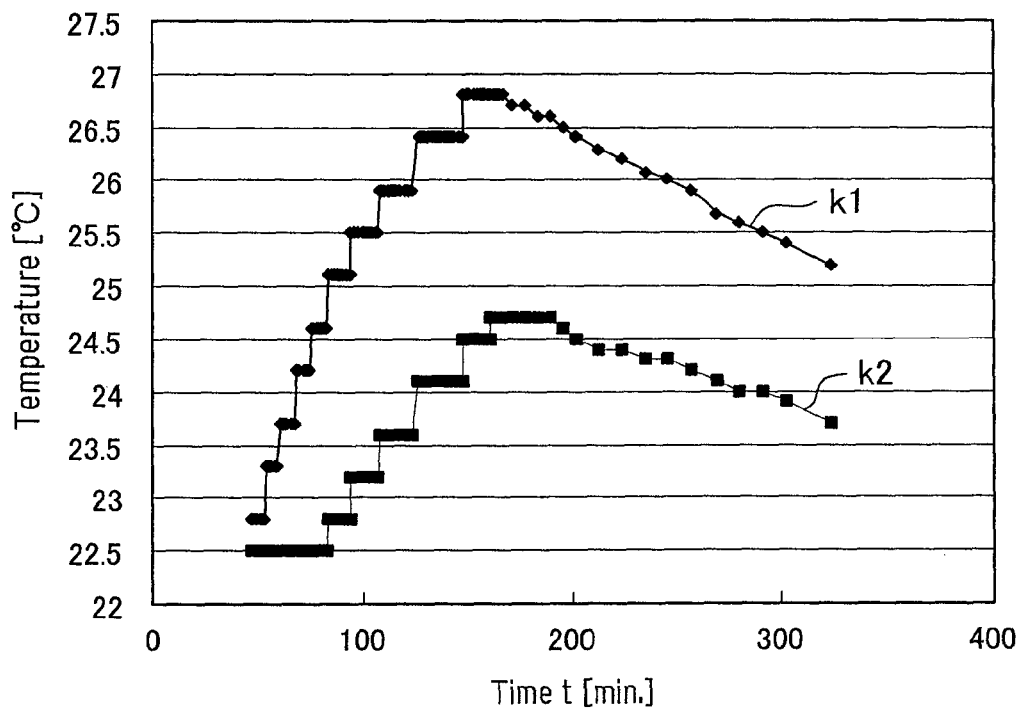
FIG. 3A is a graph showing temperature characteristics of the temperature near the polygon mirror and temperature characteristics of the internal ambient temperature of the image forming apparatus versus elapsed time after activation of the image forming apparatus.

The graph of FIG. 3A shows temperature characteristics k1 near the polygon mirror corresponding to elapsed time t after activation of the image forming apparatus 1. The graph of FIG. 3B shows displacement amount characteristics f1 of the toner image when the registration adjustment value corrected with the first correction amount B of the above equation (1) was used, the displacement amount characteristics f1 of the toner image on the intermediate transfer belt 21 corresponding to elapsed time t after activation of the image forming apparatus 1.

Figure 3B:
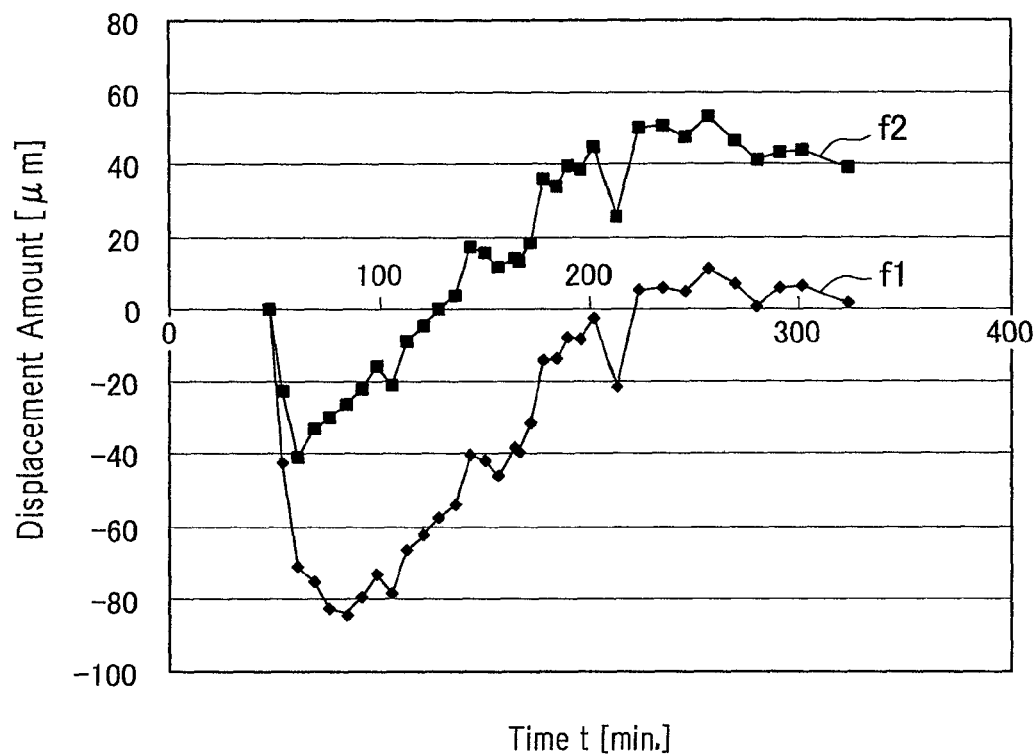
FIG. 3B is a graph showing displacement amount characteristics when a registration adjustment value is corrected by using a first correction amount and displacement amount characteristics when the registration adjustment value is corrected by using first and second correction amounts.

As is clear from the displacement amount characteristics f1 shown in FIG. 3B, in the case where the registration adjustment value corrected with the first correction amount B of the above equation (1) is used, the displacement of the toner image on the intermediate transfer belt 21 is accurately corrected after 200 minutes have passed after activation of the image forming apparatus 1.

However, the displacement of the toner image on the intermediate transfer belt 21 is not accurately corrected until 90 minutes have passed after activation of the image forming apparatus 1. On the contrary, the amount of displacement of the toner image on the intermediate transfer belt 21 has increased significantly. Then, the amount of displacement of the toner image on the intermediate transfer belt 21 is gradually reduced during the period from 90 minutes to 200 minutes after the activation.

On the other hand, the graph of FIG. 3A shows temperature characteristics k2 of the internal ambient temperature of the image forming apparatus 1 corresponding to the elapsed time t after activation of the image forming apparatus 1. The temperature characteristics k1 near the polygon mirror shown in FIG. 3A and the temperature characteristics k2 of the internal ambient temperature of the image forming apparatus 1 are compared. The internal ambient temperature of the image forming apparatus 1 rises gradually and much later than the temperature near the polygon mirror. The internal ambient temperature of the image forming apparatus 1 starts to rise approximately 90 minutes after activation of the image forming apparatus 1, and then the internal ambient temperature of the image forming apparatus 1 reaches the highest during the period from 90 minutes to 200 minutes after the activation.

A comparison is made between the temperature characteristics k2 of the internal ambient temperature of the image forming apparatus 1 shown in FIG. 3A and the displacement amount characteristics f1 of the toner image on the intermediate transfer belt 21 shown in FIG. 3B. Until 90 minutes have passed after activation of the image forming apparatus 1, the internal ambient temperature of the image forming apparatus 1 does not rise, but the amount of displacement of the toner image on the intermediate transfer belt 21 increases significantly. Furthermore, during the period from 90 minutes to 200 minutes after the activation, the internal ambient temperature of the image forming apparatus 1 gradually increases to the highest, but the amount of displacement of the toner image decreases. Accordingly, it can be said that the displacement amount characteristics f1 of the toner image shown in FIG. 3B are affected not only by the temperature change near the polygon mirror but also by the change in the internal ambient temperature of the image forming apparatus 1.

Figure 4:
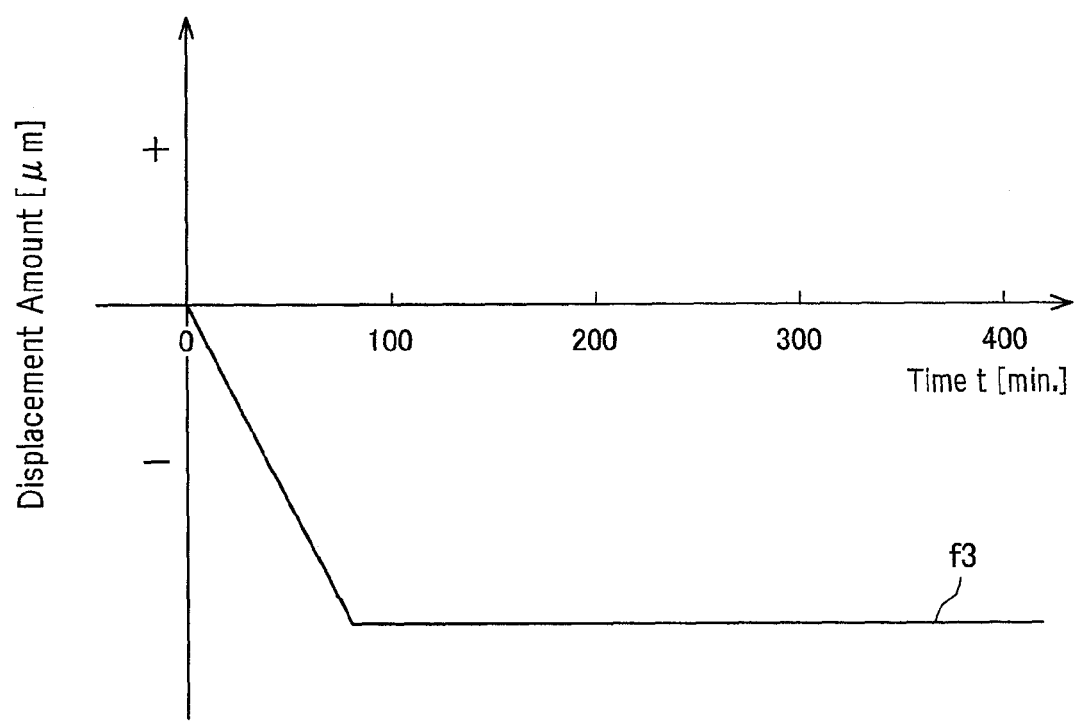
FIG. 4 is a graph showing displacement amount characteristics of a toner image on the intermediate transfer belt versus change in the internal ambient temperature of the image forming apparatus.

A comparison is made between characteristics in which the amount of displacement of the toner image is directly or inversely proportional to the temperature change shown in FIG. 2 and the displacement amount characteristics f1 of the toner image shown in FIG. 3B, from which it can be considered that, as indicated by characteristics f3 of the graph shown in FIG. 4, the amount of displacement of the toner image on the intermediate transfer belt 21 caused by the change in the internal ambient temperature of the image forming apparatus 1 varies with the elapsed time t.

Referring to the displacement amount characteristics f3 of the toner image shown in FIG. 4, the amount of displacement of the toner image changes quickly and significantly in the negative direction before the ambient temperature starts to rise. When the ambient temperature starts to rise, the change in the amount of displacement is reduced, and the amount of displacement is saturated.

In the case where the amount of correction for the registration adjustment value is determined based on such displacement amount characteristics of the toner image with respect to the change in the internal ambient temperature of the image forming apparatus 1, for example, the following equation (2) can be used.

$$C = j(k2a - k2b) \quad (2),$$

where C is the amount of correction for the registration adjustment value (second correction amount), j is a negative coefficient, $k2a$ is the internal ambient temperature of the image forming apparatus 1 during the registration step at the time of activation of the image forming apparatus 1, and $k2b$ is the internal ambient temperature of the image forming apparatus 1 during the printing step.

The amount of displacement of the toner image on the intermediate transfer belt 21 varies according to the temperature near the polygon mirror and the internal ambient temperature of the image forming apparatus 1, and it is therefore preferable to correct the amount of displacement by using the first correction amount B of the above equation (1) and the second correction amount C of the above equation (2). For example, the amount of displacement may be determined based on the following equation (3):

$$D = A + B + C \quad (3),$$

where A is the original registration adjustment value, D is the corrected registration adjustment value, B is the first correction amount determined based on the above equation (1), and C is the second correction amount determined based on the above equation (2).

The displacement amount characteristics f2 shown in FIG. 3B represent the amount of displacement of the toner image on the intermediate transfer belt 21 when the registration adjustment value D corrected based on the above equation (3) is used. As is clear from the comparison between the displacement amount characteristics f1 and the displacement amount characteristics f2 shown in FIG. 3B, the amount of displacement of the toner image on the intermediate transfer belt 21 can be reduced more by correcting the registration adjustment value based on the temperature change near the polygon mirror and the change in the internal ambient temperature of the image forming apparatus 1, than by correcting the registration adjustment value based on only the temperature change near the polygon mirror.

Next is a description of the registration step for measuring and determining the registration adjustment value for each color and the color image printing step that suppresses color drift by using the registration adjustment value of each color.

Figure 5:
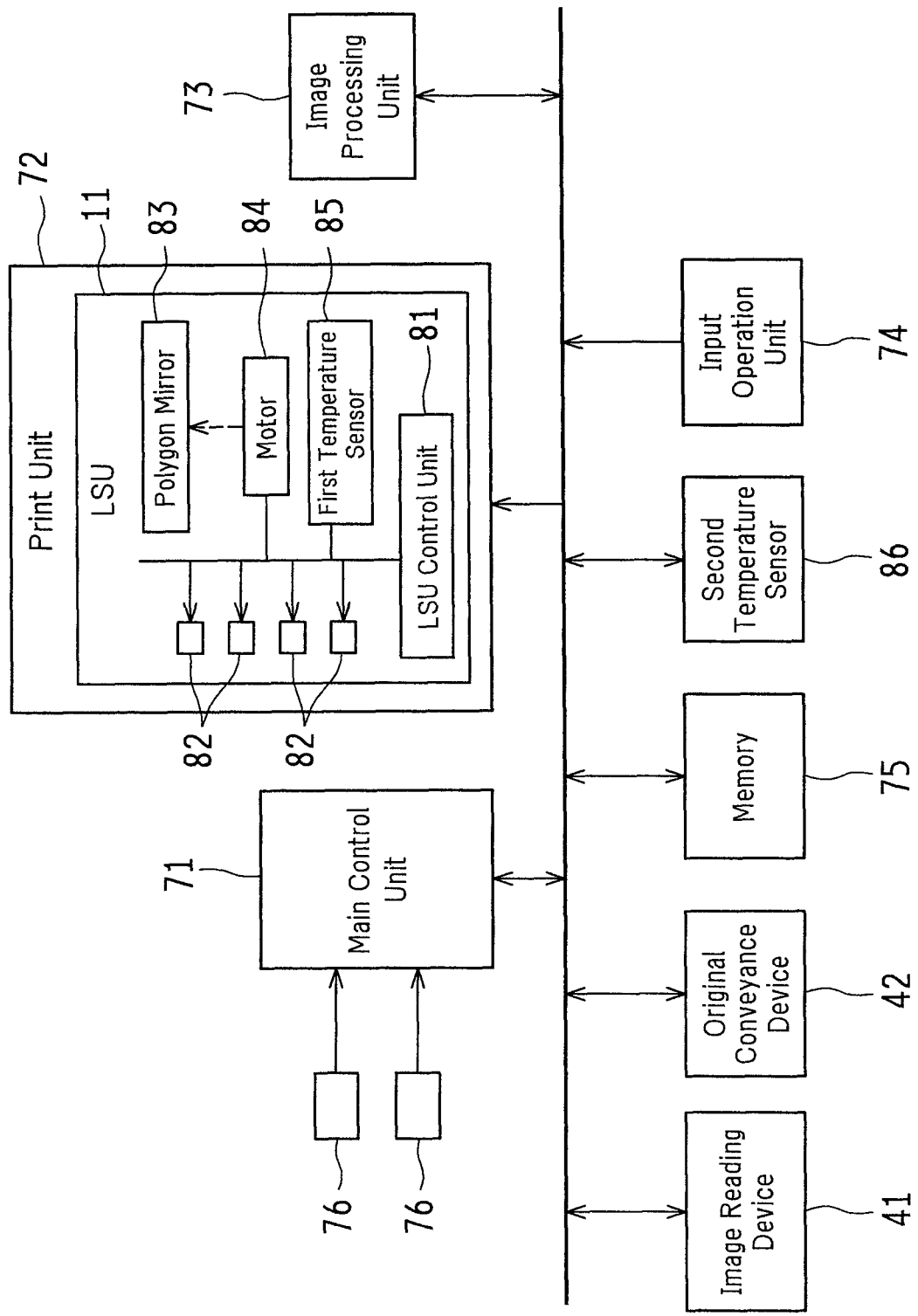
FIG. 5 is a block diagram showing a control system of the image forming apparatus shown in FIG. 1.

In FIG. 5, a main control unit 71 performs overall control of the image forming apparatus 1, and includes a CPU, a RAM, a ROM, various types of interfaces and the like.

A print unit 72 includes constituent members corresponding to the optical scanning device (LSU) 11, the developing device 12, the photosensitive drums 13, the drum cleaning devices 14, the chargers 15, the intermediate transfer belt device 16, the fixing device 17, the paper conveyance path S, the paper cassette 18, and the paper discharge tray 19 shown in FIG. 1, and prints images on recording paper.

The LSU 11 of the print unit 72 includes an LSU control unit 81, laser diodes 82 respectively corresponding to black, cyan, magenta and yellow, a polygon mirror 83 (shown in FIG. 1) that reflects laser light emitted from each laser diode 82, a polygon driving motor 84 that drives the polygon mirror 83 to rotate at a high speed, a first temperature sensor 85 (shown in FIG. 1), and the like. The LSU control unit 81 of the LSU 11 controls driving of the polygon driving motor 84 so as to rotate the polygon mirror 83 at a high speed and modulates the intensity of the laser light from each laser diode 82 according to the image data. The laser light from each laser diode 82 enters and is reflected by the polygon mirror 83 rotating at a high speed and then enters the surface of each photosensitive drum 13 while being repeatedly deflected in the main scanning direction. An electrostatic latent image corresponding to the image data is formed on the surface of each photosensitive drum 13.

The first temperature sensor 85 is disposed near the polygon mirror 83 (or the polygon driving motor 84) and detects the temperature near the polygon mirror 83. The temperature detected by the first temperature sensor 85 is input into the main control unit 71 via the LSU control unit 81.

An image processing unit 73 performs various types of image processing on the image data. An input operation unit 74 includes, for example, a plurality of input keys and a liquid crystal display device. A memory (storage unit) 75 is, for example, a hard disk drive (HDD) and stores therein various types of data and programs.

Two registration sensors 76 are provided to detect test patterns formed on the intermediate transfer belt 21 of the intermediate transfer belt device 16.

A second temperature sensor 86 is disposed in a location that is outside the LSU 11 but inside the image forming apparatus 1, and detects the internal ambient temperature of the image forming apparatus 1. The temperature detected by the second temperature sensor 86 is also input into the main control unit 71.

With such a configuration, the main control unit 71 carries out the registration step for measuring and determining the registration adjustment value for each color, for example, at the time of activation of the image forming apparatus 1.

Figure 6:
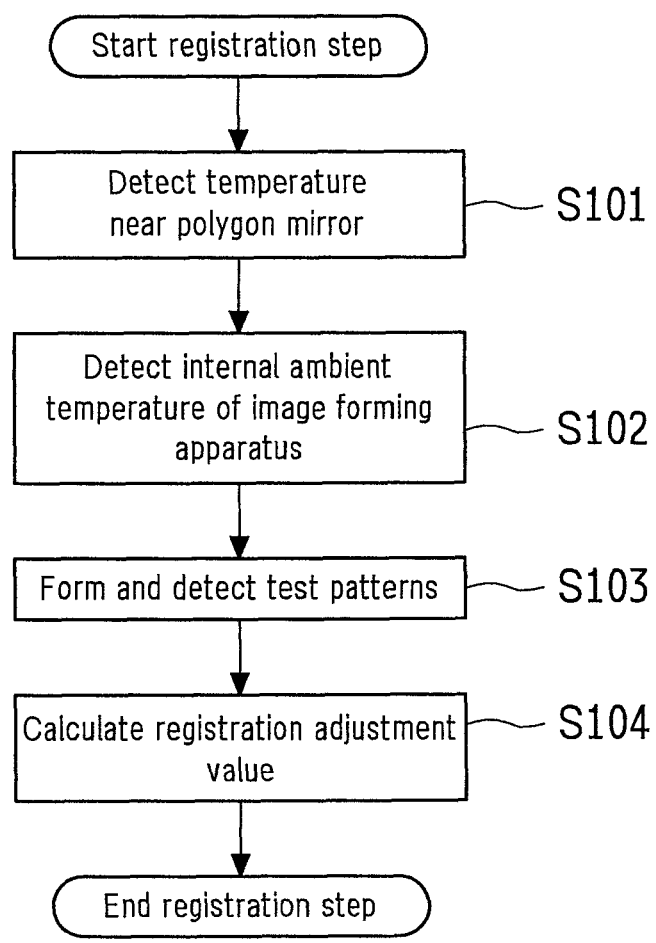
FIG. 6 is a flowchart illustrating the procedure of a registration step of the image forming apparatus shown in FIG. 1.

A procedure for the registration step will be described next in detail with reference to the flowchart of FIG. 6. The registration step is assumed to be carried out, for example, in a short time immediately after activation of the image forming apparatus 1.

First, when the main control unit 71 is turned on and the image forming apparatus 1 is activated, the registration step starts. At the start thereof, the main control unit 71 obtains the temperature k1a (° C.) near the polygon mirror 83 detected by the first temperature sensor 85 and stores the temperature k1a (° C.) near the polygon mirror 83 in the memory 75 (step S101, temperature detecting step).

The main control unit 71 obtains the internal ambient temperature k2a of the image forming apparatus 1 detected by the second temperature sensor 86, and stores the internal ambient temperature k2a (° C.) of the image forming apparatus 1 in the memory 75 (step S102, temperature detecting step).

In the registration step, for each photosensitive drum 13 (for each color), a pair of electrostatic latent images for test patterns are formed on opposite edge portions of the photosensitive drum 13 by the LSU 11. The electrostatic latent images on the edge portions of the photosensitive drum 13 are developed by the developing device 12 so as to form test patterns (toner images) on the edge portions of the photosensitive drum 13. The test patterns (toner images) on the edge portions of the photosensitive drum 13 are transferred and formed onto opposite edge portions of the intermediate transfer belt 21.

Next, the registration sensors 76 respectively detect, for each color, test patterns P1 and P2 conveyed in the sub-scanning direction by rotational movement of the intermediate transfer belt 21, and consecutively output their detected outputs to the main control unit 71 (step S103).

Figure 7:
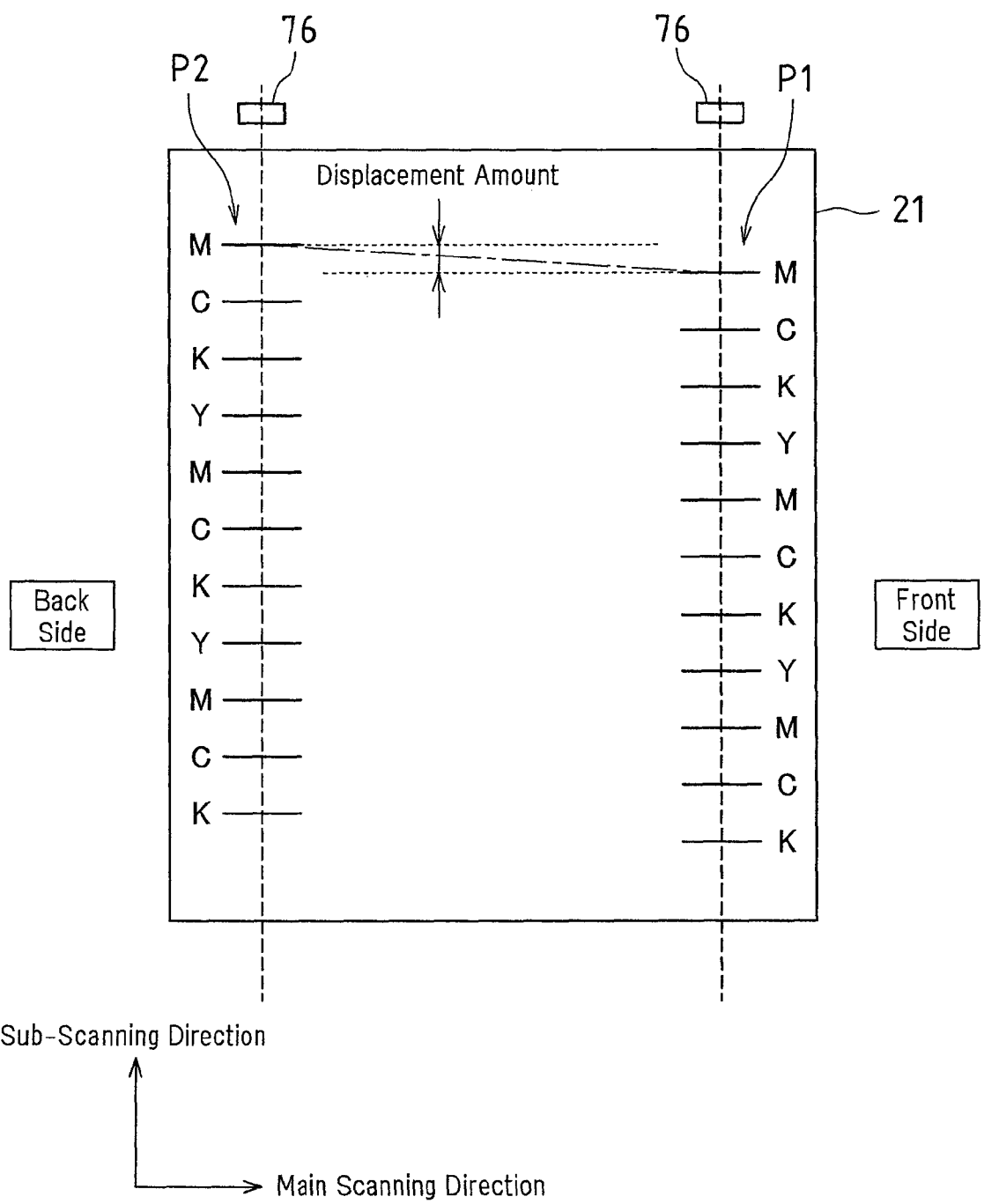
FIG. 7 is a plan view schematically showing test patterns transferred onto opposite edge portions of the intermediate transfer belt.

FIG. 7 schematically shows the pair of test patterns P1 and P2 that have been transferred onto opposite edge portions of the intermediate transfer belt 21 for each color (YMCK). The registration sensors 76 that respectively detect the test patterns P1 and P2 are provided near the edge portions of the intermediate transfer belt 21.

Next, the main control unit 71 receives, for each color, input of the detected outputs of the registration sensors 76, determines the transfer positions in the sub-scanning direction of the test patterns P1 and P2 based on the detection timing of the test patterns P1 and P2 and the speed of the rotational movement of the intermediate transfer belt 21, measures the amount of displacement (registration adjustment value A) in the sub-scanning direction of the test patterns P1 and P2 and stores the registration adjustment value A of that color in the memory 75 (step S104).

Use of patterns that are oblique to the sub-scanning direction as the test patterns P1 and P2 enables measurement of displacement in the main scanning direction of the test patterns P1 and P2.

After the registration step has been carried out, the color image printing step is carried out. For example, the main control unit 71 controls the image reading device 41 and the original conveyance device 42 such that the image reading device 41 reads the image on the original while the original conveyance device 42 is conveying the original, causes the memory 75 to store image data representing the image on the original, causes the image processing unit 73 to process the image data, and causes the print unit 72 to record the image on the original represented by the image data stored in the memory 75 on recording paper.

In the printing step, the registration adjustment value A of each color determined in the registration step is corrected based on the temperature change near the polygon mirror 83 and the change in the internal ambient temperature of the image forming apparatus 1, the write timing of an electrostatic latent image onto each photosensitive drum 13 by the LSU 11 is controlled, and the position of the electrostatic latent image on each photosensitive drum 13 is shifted by an amount corresponding to the corrected registration adjustment value, whereby the displacement of the toner image of each color on the intermediate transfer belt 21 is accurately corrected, and color drift of the color image transferred to recording paper is favorably suppressed.

Figure 8:
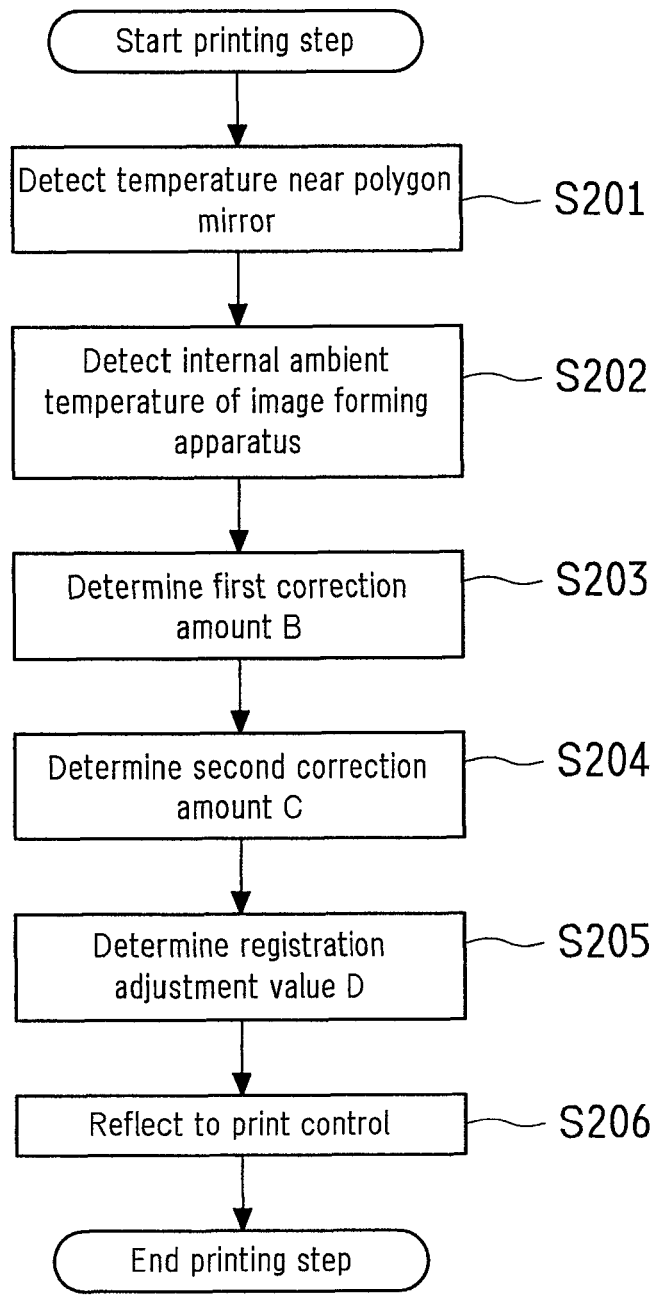
FIG. 8 is a flowchart illustrating the procedure of a printing step of the image forming apparatus shown in FIG. 1.

Next, the printing step will be described with reference to the flowchart of FIG. 8. The printing step is assumed to be performed immediately after the registration step.

First, the main control unit 71 obtains the temperature k1b (° C.) near the polygon mirror 83 detected by the first temperature sensor 85, and stores the temperature k1b (° C.) near the polygon mirror 83 in the memory 75 (step S201). The main control unit 71 also obtains the internal ambient temperature k2b of the image forming apparatus 1 detected by the second temperature sensor 86, and stores the internal ambient temperature k2b (° C.) of the image forming apparatus 1 in the memory 75 (S202, temperature detecting step).

Next, the main control unit 71 reads out, from the memory 75, the temperature k1*a* (° C.) near the polygon mirror 83 during the registration step, and the temperature k1*b* (° C.) near the polygon mirror 83 during the printing step, and determines the first correction amount B of the registration adjustment value A of each color based on the above equation (1) (step S203, registration correction operation step).

Next, the main control unit 71 reads out, from the memory 75, the internal ambient temperature k2*a* of the image forming apparatus 1 during the registration step and the internal ambient temperature k2*b* (° C.) of the image forming apparatus 1 during the printing step, and determines the second correction amount C of the registration adjustment value A of each color based on the above equation (2) (step S204, registration correction operation step).

Next, the main control unit 71 corrects the registration adjustment value A of each color based on the above equation (3) and determines the corrected registration adjustment value D of each color (step S205, registration correction operation step).

After that, the main control unit 71 controls the write timing of an electrostatic latent image onto each photosensitive drum 13 by the LSU 11, and shifts the position of the electrostatic latent image on the photosensitive drum 13 by an amount corresponding to the corrected registration adjustment value D. The displacement of the toner image of each color on the intermediate transfer belt 21 is thereby accurately corrected (step S206).

In the above embodiment, the registration adjustment value A is corrected using the first and second correction amounts B and C when the temperature near the polygon mirror 83 and the internal ambient temperature of the image forming apparatus 1 rise. However, even when the temperature near the polygon mirror 83 and the internal ambient temperature of the image forming apparatus 1 decrease, the internal ambient temperature of the image forming apparatus 1 decreases gradually and much later than the temperature near the polygon mirror. In the case of the occurrence of such a phenomenon, even if the registration adjustment value A is corrected by using only the first correction amount, the amount of displacement of registration increases significantly. Accordingly, it is preferable to correct the registration adjustment value A by using the first and second correction amounts.

For example, as shown in FIG. 3A, the printing step stops when approximately 200 minutes have passed, and the temperature near the polygon mirror 83 drops quickly, and the internal ambient temperature of the image forming apparatus 1 starts to decrease much later than that. Also, with respect to the displacement amount characteristics f1 shown in FIG. 3B, if the registration adjustment value A is corrected by using only the first correction amount B based on the above equation (1), the amount of displacement of the toner image increases when approximately 200 minutes have passed.

Accordingly, when the temperature near the polygon mirror 83 and the internal ambient temperature of the image forming apparatus 1 decrease, a second correction amount C' corresponding to the change in the internal ambient temperature of the image forming apparatus 1 is determined. The registration adjustment value A of each color is corrected by using the first and second correction amounts B and C', and thereby the amount of displacement of registration is reduced.

The amount of displacement of the toner image is proportional to the temperature change near the polygon mirror 83 and thus can be determined with a linear function such as the above equation (1), but the internal ambient temperature of the image forming apparatus 1 may change irregularly. For this reason, the second correction amount corresponding to the change in the internal ambient temperature of the image forming apparatus 1 may be determined based on a quadratic function, higher-order function, fractional function or the like. Alternatively, it is also possible to make distinction between increasing change and decreasing change in the internal ambient temperature of the image forming apparatus 1 and determine a second correction amount for each change.

Also, in the above embodiment, the correction amounts of the registration adjustment value are determined by using the operation equations, but it is also possible to determine the first correction amount by referring to a data table in which the temperature near the polygon mirror 83 and the first correction amount are associated and determine the second correction amount by referring to a data table in which the internal ambient temperature of the image forming apparatus 1 and the second correction amount are associated.

Also, the second temperature sensor 86 is disposed in a location that is outside the LSU 11 but inside the image forming apparatus 1, but the second temperature sensor 86 may be disposed in a location that is inside the LSU 11 and farther away from the polygon mirror 83 than the first temperature sensor 85 is. The temperature at the location that is inside the LSU 11 and farther away from the polygon mirror 83 varies by being more significantly affected by the internal ambient temperature of the image forming apparatus 1 than by the temperature near the polygon mirror 83. Accordingly, the influence of the change in the internal ambient temperature of the image forming apparatus 1 can be determined as well by detecting the temperature at the location that is inside the LSU 11 and farther away from the polygon mirror 83, and therefore color drift can be corrected more accurately.

Alternatively, the second temperature sensor 86 may be disposed in an appropriate location in an imaging process unit. The imaging process unit includes the LSU 11, the developing devices 12, the photosensitive drums 13, the drum cleaning devices 14, the chargers 15 and the intermediate transfer belt device 16 shown in FIG. 1, and is configured to carry out an imaging process in which an electrostatic latent image is written onto each photosensitive drum 13 by using laser light from the LSU 11, the electrostatic latent image on each photosensitive drum 13 is developed to form a toner image of the corresponding color on each photosensitive drum 13, the toner image of each color is transferred and superimposed from each photosensitive drum 13 onto the intermediate transfer belt 21, and the color image is transferred from the intermediate transfer belt 21 to recording paper. The imaging process unit does not perform a step of supplying recording paper from the paper cassette 18 or a step of fixing the color image on the recording paper by the fixing device 17 as described above. The ambient temperature of the imaging process unit as described above is considered to significantly affect the amount of displacement of the toner image of each color on the intermediate transfer belt 21.

In the above embodiment, a configuration was used in which the toner image of each color on the photosensitive drum 13 is superimposed and transferred onto the intermediate transfer belt 21, and the toner image of each color on the intermediate transfer belt 21 is transferred onto recording paper, but the configuration may be such that the toner image of each color on the photosensitive drum 13 may be superimposed and transferred directly onto recording paper.

The present invention can be embodied and practiced in other different forms without departing from the spirit and essential characteristics thereof. Therefore, the above-described embodiment is considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A registration adjustment method for an image forming apparatus, the image forming apparatus including: an imaging process unit that forms a color visible image by writing a latent image on each of a plurality of image carriers with laser light from an optical scanning device, developing the latent images on the image carriers to form visible images of respective colors on the image carriers, and superimposing and transferring the visible images of respective colors on the image carriers onto a recording medium; and a registration correction unit that detects displacement of test patterns of each color in the color visible image as a registration adjustment value and corrects positions of the superimposed and transferred visible images of respective colors based on the registration adjustment values, the registration adjustment method comprising:

a registration step of measuring and determining the registration adjustment value for each color; and a printing step of correcting the registration adjustment value for each color determined in the registration step so as to print the color visible image, wherein the registration step and the printing step include:

a first temperature detecting step of detecting, by using a first temperature detecting unit, a temperature near a polygon mirror that reflects and scans the laser light in the optical scanning device; and a second temperature detecting step of detecting, by using a second temperature detecting unit, an internal ambient temperature of the image forming apparatus at a location that is outside the optical scanning device and that is farther away from the polygon mirror than the first temperature detecting unit is;

wherein, during the printing step, a difference between the temperature detected by the first temperature detecting unit in the registration step and the temperature detected by the first temperature detecting unit in the printing step is obtained; and a difference between the temperature detected by the second temperature detecting unit in the registration step and the temperature detected by the second temperature detecting unit in the printing step is obtained, and wherein a registration correction operation step of correcting the registration adjustment values is executed based on a change in the temperature detected by the first temperature detecting unit and a change in the temperature detected by the second temperature detecting unit.

2. The registration adjustment method for an image forming apparatus according to claim 1, wherein in the registration correction operation step, a first registration intermediate adjustment value that varies according to the change in the temperature detected by the first temperature detecting unit is determined, a first correction amount that varies according to the change in the temperature detected by the first temperature detecting unit is determined, a second correction amount that varies according to the change in the temperature detected by the second temperature detecting unit is determined, and a sum of the first correction amount and the second correction amount is determined as the registration adjustment value.

3. An image forming apparatus that performs registration adjustment comprising:

an imaging process unit that forms a color visible image by writing a latent image on each of a plurality of image carriers with laser light from an optical scanning device, developing the latent images on the image carriers to form visible images of respective colors on the image carriers, and superimposing and transferring the visible images of respective colors on the image carriers onto a recording medium;

a registration correction unit that detects, in a registration step, displacement of test patterns of each color in the color visible image as a registration adjustment value and corrects, in a printing step, positions of the superimposed and transferred visible images of respective colors based on the registration adjustment values;

a first temperature detecting unit that detects, in both the registration step and the printing step, a temperature near a polygon mirror that reflects and scans the laser light in the optical scanning device;

a second temperature detecting unit that detects, in both the registration step and the printing step, an internal ambient temperature of the image forming apparatus outside the optical scanning device; and a registration correction operation unit that corrects the registration adjustment values based on a change in the temperatures between the registration step and the printing step, both detected by the first temperature detecting unit, and a change in the temperatures between the registration step and the printing step, both detected by the second temperature detecting unit.

4. The image forming apparatus according to claim 3, wherein the registration correction operation unit determines a first registration intermediate adjustment value that varies according to the change in the temperature detected by the first temperature detecting unit, determines a first correction amount that varies according to the change in the temperature detected by the first temperature detecting unit, determines a second correction amount that varies according to the change in the temperature detected by the second temperature detecting unit, and determines a sum of the first correction amount and the second correction amount as the registration adjustment value.

* * * * *